(12) United States Patent
Thomas (10) Patent No.: US 8,604,129 B2
(45) Date of Patent: Dec. 10, 2013

(54) SHEET MATERIALS CONTAINING S-B-S AND S-I/B-S COPOLYMERS

(75) Inventor: Oomman P. Thomas, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 88 days.

(21) Appl. No.: 12/982,033

(22) Filed: Dec. 30, 2010

(65) Prior Publication Data
US 2012/0172214 A1    Jul. 5, 2012

(51) Int. Cl.
*B32B 27/12* (2006.01)
*C08L 53/02* (2006.01)

(52) U.S. Cl.
USPC ............. 525/88; 428/221; 428/521; 604/365; 604/366; 604/372

(58) Field of Classification Search
USPC ............. 525/89; 428/221, 521; 604/365, 366, 604/372
See application file for complete search history.

(56) References Cited

U.S. PATENT DOCUMENTS

| | | | |
|---|---|---|---|
| 5,702,827 A * | 12/1997 | Itoh et al. | 428/519 |
| 6,452,063 B1 | 9/2002 | Curro et al. | |
| 2005/0124709 A1 * | 6/2005 | Krueger et al. | 521/50 |
| 2005/0233249 A1 * | 10/2005 | Muldermans et al. | 430/300 |
| 2006/0025745 A1 * | 2/2006 | Toro et al. | 604/385.101 |
| 2006/0155044 A1 | 7/2006 | Joly et al. | |
| 2007/0108078 A1 * | 5/2007 | Molina et al. | 206/438 |
| 2008/0057236 A1 | 3/2008 | Yamada et al. | |
| 2009/0099314 A1 | 4/2009 | Thomas et al. | |
| 2009/0325440 A1 | 12/2009 | Thomas et al. | |
| 2010/0056697 A1 | 3/2010 | Uzee et al. | |
| 2010/0168704 A1 | 7/2010 | Thomas et al. | |
| 2012/0172516 A1 | 7/2012 | Wright et al. | |

FOREIGN PATENT DOCUMENTS

| WO | WO 2006/071321 A1 | 7/2006 |
|---|---|---|
| WO | WO 2008/063807 | 5/2008 |

OTHER PUBLICATIONS

Donker, Chretien, 'A New Generation of Hot Melt Tape Formulations, Using Blends of SIBS and SBS Block Copolymers and New Hydrocarbon Tackifying Resins,' paper presented at $3^{rd}$ AFERA Technical Conference, Apr. 5-7, 2006, pp. 1-7.

* cited by examiner

*Primary Examiner* — Jeffrey Mullis
(74) *Attorney, Agent, or Firm* — Patrick C. Wilson; Richard M. Shane (57) ABSTRACT

A sheet material that includes an elastic component or material (e.g., film, nonwoven web laminated to the elastic component, etc.) is provided. The elastic component is formed from a styrenic block copolymer composition containing from about 10 wt. % to about 90 wt. % of styrene-butadiene-styrene block copolymer; and from about 10 wt % to about 90 wt. % of styrene-isoprene/butadiene-styrene block copolymer. The styrenic block copolymer composition has good viscosity stability during extrusion and thus may be readily formed into an elastic sheet material. The elastic sheet material may be subsequently crosslinked to achieve the desired elastic and mechanical properties.

8 Claims, 2 Drawing Sheets

SHEET MATERIALS CONTAINING S-B-S AND S-I/B-S COPOLYMERS

BACKGROUND OF THE INVENTION

Elastic sheet materials are commonly incorporated into products (e.g., diapers, training pants, garments, etc.) to improve their ability to better fit the contours of the body. For example, an elastic composite may be formed from an elastic sheet material and one or more nonwoven web facings. The nonwoven web facing may itself be extensible. Alternatively, the nonwoven web facing may be joined to the elastic sheet material while the elastic sheet material is in a stretched condition so that the nonwoven web facing can gather between the locations where it is bonded to the elastic sheet material when it is relaxed. The resulting elastic composite is stretchable to the extent that the nonwoven web facing gathered between the bond locations allows the elastic film to elongate.

Styrenic block copolymers are often employed to form the elastic components of such composites. For example, the styrenic block copolymer may contain a conjugated butadiene block positioned between two styrene blocks (i.e., S-B-S). Styrenic block copolymers containing conjugated butadiene blocks may be cross-linked to improve elastic performance. Suitably, the styrenic block copolymers may be melt extruded to form the elastic sheet materials. However, such polymers may be difficult to process by melt extrusion due to premature cross-linking of the butadiene block during the extrusion process. As such, a need exists for elastic materials that have good melt stability during processing, yet exhibit good elastic performance during use.

SUMMARY OF THE INVENTION

In accordance with one embodiment, an elastic sheet material is disclosed that includes an elastic component that is formed from a styrenic block copolymer composition including from about 10 wt. % to about 90 wt. % of styrene-butadiene-styrene block copolymer; and from about 10 wt % to about 90 wt. % of styrene-isoprene/butadiene-styrene block copolymer. In one aspect, the styrenic block copolymer composition is crosslinked. In a further aspect, the elastic component has a machine direction tensile strength of at least about 1600 psi. In an even further aspect, the elastic component is a film, foam, strands, web, or a combination thereof.

In one aspect, in a dynamic rheology measurement in air at 356° F., the elastic composition exhibits a time at which tan delta equals 1 of at least about 44 minutes.

In a further aspect, the sheet material is a composite that contains a nonwoven web facing laminated to the elastic component.

In accordance with another embodiment, a method of forming an elastic sheet material includes melt extruding a styrenic block copolymer composition containing from about 10 wt. % to about 90 wt. % of styrene-butadiene-styrene block copolymer; and from about 10 wt % to about 90 wt. % of styrene-isoprene/butadiene-styrene block copolymer; and forming an elastic sheet material from the melt extruded styrenic block copolymer composition. In one aspect, the elastic sheet material is a film, foam, strands, web, or a combination thereof. In another aspect, the elastic sheet material has a machine direction tensile strength of at least about 1600 psi. In a further aspect, the styrenic block copolymer composition may exhibit a time at which tan delta equals 1 of at least about 44 minutes in a dynamic rheology measurement in air at 356° F.

In one aspect, the method further includes crosslinking the styrenic block copolymer composition. The crosslinking may be induced by electromagnetic radiation. In a further aspect, the styrenic block copolymer composition does not crosslink during the melt extruding step.

In another aspect, the method further includes a step of laminating the elastic sheet material to a nonwoven web facing. The laminating may occur prior to or after crosslinking of the styrenic block copolymer composition.

In accordance with a further embodiment, a sheet material includes an elastic component that comprises an elastic composition comprising from about 10 wt. % to about 90 wt. % of a crosslinked styrene-butadiene-styrene block copolymer and from about 10 wt % to about 90 wt. % of a crosslinked styrene-isoprene/butadiene-styrene block copolymer.

Other features and aspects of the present invention are described in more detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Repeat use of reference characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations.

Generally speaking, the present invention is directed to a sheet material that includes an elastic component or material (e.g., film, foam, strands, nonwoven web, nonwoven web laminated to an elastic material, etc.). The elastic component is formed from a styrenic block copolymer composition including from about 10 wt. % to about 90 wt. % of styrene-butadiene-styrene block copolymer; and from about 10 wt % to about 90 wt. % of styrene-isoprene/butadiene-styrene block copolymer.

As used herein, the term "elastic" refers to a material that, upon application of a stretching force, is stretchable in a direction (such as the MD or CD direction), and which upon release of the stretching force, contracts/returns to approximately its original dimension. For example, a stretched material may have a stretched length that is at least 50% greater than its relaxed unstretched length, and which will recover to within at least 50% of its stretched length upon release of the stretching force. A hypothetical example would be a 2.54-cm sample of a material that is stretchable to at least 3.81 centimeters and which, upon release of the stretching force, will recover to a length of not more than 3.175 centimeters. Desirably, the material contracts or recovers at least 50%, and even more desirably, at least 80% of the stretched length.

Elastic Composition

The styrenic block copolymer composition of the present invention includes two different styrenic block copolymers, namely: 1) a styrene-butadiene-styrene (S-B-S) block copolymer, and 2) a styrene-isoprene/butadiene-styrene (S-I/B-S) block copolymer. Such styrenic block copolymers may be formed using any known technique, such as sequential polymerization, incremental polymerization, or through coupling, which may leave a residue of the coupling agent in the polymer. In the case of the styrene-isoprene/butadiene-styrene block copolymer, the mid block is desirably a random block copolymer. These block copolymers may be linear tri-block copolymers where the block copolymers have the form S-B-S and S-I/B-S. Likewise, both of these polymers may be coupled copolymers. For example, the SBS block copolymer may have the form of (S-B)nX where n is the number of arms and is 2 or more, and X is a coupling agent residue. As a further example, the S-I/B-S block copolymer may take the form of (S-I/B)nX where n is the number of arms and is 2 or more, and X is a coupling agent residue. Therefore these block copolymers of various architectures can be combined as part of the present invention.

The styrenic block copolymer composition suitably includes from about 10 wt. % to about 90 wt. % of the styrene-butadiene-styrene (S-B-S) block copolymer. In some embodiments, the styrenic block copolymer composition may include from about 10 wt. % to about 75 wt. % of the S-B-S block copolymer, or from about 10 wt. % to about 60 wt. % of the S-B-S block copolymer, or from about 10 wt. % to about 50 wt. % of the S-B-S block copolymer. In other embodiments, the styrenic block copolymer composition may include from about 25 wt. % to about 90 wt. % of the S-B-S block copolymer, or from about 30 wt. % to about 90 wt. % of the S-B-S block copolymer, or from about 35 wt. % to about 90 wt. % of the S-B-S block copolymer. In further embodiments, the styrenic block copolymer composition may include from about 25 wt. % to about 75 wt. % of the S-B-S block copolymer, or from about 25 wt. % to about 50 wt. % of the S-B-S block copolymer, or from about 30 wt. % to about 60 wt. % of the S-B-S block copolymer, or from about 35 wt. % to about 50 wt. % of the S-B-S block copolymer.

The styrenic block copolymer composition suitably includes from about 10 wt % to about 90 wt. % of the styrene-isoprene/butadiene-styrene (S-I/B-S) block copolymer. In some embodiments, the styrenic block copolymer composition may include from about 10 wt. % to about 75 wt. % of the S-I/B-S block copolymer, or from about 10 wt. % to about 70 wt. % of the S-I/B-S block copolymer, or from about 10 wt. % to about 65 wt. % of the S-I/B-S block copolymer. In other embodiments, the styrenic block copolymer composition may include from about 25 wt. % to about 90 wt. % of the S-I/B-S block copolymer, or from about 40 wt. % to about 90 wt. % of the S-I/B-S block copolymer, or from about 50 wt. % to about 90 wt. % of the S-I/B-S block copolymer, or from about 50 wt. % to about 75 wt. % of the S-I/B-S block copolymer. In further embodiments, the styrenic block copolymer composition may include from about 25 wt. % to about 75 wt. % of the S-I/B-S block copolymer, or from about 40 wt. % to about 70 wt. % of the S-I/B-S block copolymer, or from about 50 wt. % to about 65 wt. % of the S-I/B-S block copolymer.

The styrenic endblocks "S" may include styrene, as well as derivatives thereof, such as α-methylstyrene, p-methylstyrene, p-tert-butyl styrene, p-ethylstyrene, m-isopropylstyrene, p-hexylstyrene, α-methylstyrene, α,4-dimethylstyrene, 1,3 dimethylstyrene p-methylstyrene; etc., as well as other monoalkenyl polycyclic aromatic compounds, such as vinyl naphthalene, vinyl anthrycene; and so forth. Preferred monoalkenyl aromatics are styrene and p-methylstyrene.

A variety of characteristics of the styrenic block copolymers may be selectively varied to achieve the desired properties of the elastic material. For example, the styrenic block copolymers may possess a molecular weight within an optimum range for processing. Namely, polymers having too great of a molecular weight generally possess heavily entangled polymer chains and thus result in a thermoplastic composition that is difficult to process. Conversely, polymers having too low of a molecular weight do not generally possess enough entanglement, which leads to a relatively weak melt strength. Thus, the styrenic block copolymers are typically formed to have a number average molecular weight ("$M_n$") ranging from about 30,000 to about 250,000 grams per mole, in some embodiments from about 40,000 to about 200,000 grams per mole, in some embodiments from about 50,000 to about 150,000 grams per mole, and in some embodiments, from about 70,000 to about 110,000 grams per mole. The number average molecular weight may be determined by methods known to those skilled in the art. The molecular weight of each block may also be controlled to influence the rheology, molecular weight, and thermal properties of the copolymers. Styrenic blocks with a lower molecular weight, for instance, may result in copolymers with lower softening/melting points and molecular weights. However, too low of a molecular weight may adversely affect the strength of the resulting elastic material. Thus, each styrenic blocks employed in the copolymers may have a number average molecular weight ("$M_n$") of from about 5,000 to about 35,000 grams per mole, in some embodiments from about 7,500 to about 30,000 grams per mole, and in some embodiments, from about 10,000 to about 25,000 grams per mole. Likewise, each conjugated diene block employed in the copolymers may have a number average molecular weight ("$M_n$") ranging from about 20,000 to about 150,000 grams per mole, in some embodiments from about 30,000 to about 120,000 grams per mole, and in some embodiments, from about 40,000 to about 100,000 grams per mole.

The relative amounts of the blocks in the copolymers may also influence the properties of the resulting elastic material. For example, lower styrenic block concentrations may result in copolymers with lower melting/softening points and molecular weights. However, too high of a styrenic block concentration may not provide the desired properties and may result in copolymers with higher melting/softening points. Thus, the styrenic block(s) typically constitute from about 1 wt. % to about 40 wt. %, in some embodiments from about 5 wt. % to about 35 wt. %, and in some embodiments, from about 15 wt. % to about 30 wt. % of the copolymer. Likewise, the conjugated diene blocks typically constitute from about 60 wt. % to about 99 wt. %, in some embodiments from about 65 wt. % to about 95 wt. %, and in some embodiments, from about 70 wt. % to about 85 wt. % of the copolymer.

To provide improved processability, in a dynamic rheology measurement, the elastic composition suitably exhibits a time (measured as described below) at which a tan delta (measured as described below) equals 1 that is long enough to prevent crosslinking of the elastic composition during a melt extrusion process for making sheet materials. Suitably, the elastic composition exhibits a time at which tan delta equals 1 of at least about 44 minutes in a 60 minute dynamic rheology test in air at 356° F. In other embodiments, the elastic composition may exhibit a time at which tan delta equals 1 of about 44 minutes to about 120 minutes, or of about 44 minutes to about 1000 minutes in a dynamic theology test in air at 356° F.

To provide improved processability of the elastic composition, the styrenic block copolymers may be formed to have a "melt flow rate" within a certain range. The melt flow rate is the weight of a polymer (in grams) that may be forced through an extrusion rheometer orifice (0.0825-inch diameter) when subjected to a force of 2160 grams in 10 minutes at a certain temperature (e.g., 190° C. or 230° C.). More specifically, polymers having a low melt flow rate, or conversely a high viscosity, are generally difficult to process. Thus, in most embodiments, the melt flow rate of the styrenic block copolymers and the elastic composition is high enough to provide a low viscosity polymer and/or elastic composition that is easy to process, such as at least about 1 gram per 10 minutes, in some embodiments at least about 10 grams per 10 minutes, and in some embodiments, from about 15 to about 500 grams per 10 minutes, measured in accordance with ASTM Test Method D1238-E at 170° C. Of course, the melt flow rate of the styrenic block copolymers and the elastic composition will ultimately depend upon the selected forming process.

Suitably, the styrenic block copolymer mixture or blend (SBS and S-I/B-S) may have a butadiene content greater than or equal to 45 wt. % of the composition, and more suitably at least 47 wt. %, for economic benefit. Desirably, the rubbery elastomeric or midblock portion is desirably the majority part of the styrenic block copolymer.

The elastic composition suitably includes the two block copolymers in an amount of about 10 wt. % or more, in some embodiments about 25 wt. % or more, in some embodiments about 50 wt. % or more, in some embodiments about 75 wt. % or more, and in some embodiments, from about 75 wt. % to about 95 wt. % of the polymer content of the elastic composition. Of course, other polymers may also be employed in the elastic material.

Suitable SBS block copolymers may be obtained from Kraton Polymers LLC in Houston, Tex. as the Kraton D polymer family. Specifically, a suitable coupled copolymer of SBS may be D1102. A suitable linear SBS copolymer may be D1153. Other suitable SBS block copolymers are also available from Dexco under the tradename Vector, for example Vector 8508. Still other suitable SBS block copolymers are also available from Enichem, under the tradename Europrene Sol-T such as 166 as well as Kosyn KTR 201 from Korea Kumho Petrochemical Company. Still other suitable SBS block copolymers may be sourced from Taiwan Synthetic Rubber Company as Taipol 3202.

Suitable S-I/B-S linear and/or coupled copolymers would be D1170 or D1171, respectively, available from Kraton Polymers LLC. S-I-B-S Quadblock copolymers may also be utilized under the present invention (available from Dexco Polymers LP).

In one embodiment, for example, the elastic composition may further include an additional thermoplastic elastomer to improve the elastic performance of the resulting elastic material. Any of a variety of thermoplastic elastomers may generally be employed, such as elastomeric polyesters, elastomeric polyurethanes, elastomeric polyamides, other elastomeric copolymers, and so forth.

In another embodiment, for example, the elastic composition may further include a polyolefin, such as polyethylene, polypropylene, blends and copolymers thereof. In one particular embodiment, a polyethylene is employed that is a copolymer of ethylene or propylene and an α-olefin, such as a $C_3$-$C_{20}$ α-olefin or $C_3$-$C_{12}$ α-olefin. Suitable α-olefins may be linear or branched (e.g., one or more $C_1$-$C_3$ alkyl branches, or an aryl group).

When employed, the additional polymer(s) typically constitute from about 0.5 to about 50 wt. % of the elastic composition, in some embodiments from about 0.75 to about 50 wt. %, in some embodiments from about 1 wt. % to about 50 wt. %, in some embodiments from about 2 wt. % to about 40 wt. %, and in some embodiments, from about 5 wt. % to about 25 wt. % of the elastic material composition.

Besides polymers, the elastic composition may also contain other components as is known in the art. In one embodiment, for example, the elastic composition contains a filler. Fillers are particulates or other forms of material that may be added to a film polymer extrusion blend and that will not chemically interfere with the extruded film, but which may be uniformly dispersed throughout the film. Fillers may serve a variety of purposes, including enhancing film opacity and/or breathability (i.e., vapor-permeable and substantially liquid-impermeable). For instance, filled films may be made breathable by stretching, which causes the polymer to break away from the filler and create microporous passageways. Breathable microporous elastic films are described, for example, in U.S. Pat. Nos. 5,997,981; 6,015,764; and 6,111,163 to McCormack, et al.; 5,932,497 to Morman, et al.; 6,461,457 to Taylor, et al., which are incorporated herein in their entirety by reference thereto for all purposes.

Other additives may also be incorporated into the elastic composition, such as crosslinking catalysts, pro-rad additives, melt stabilizers, processing stabilizers, heat stabilizers, light stabilizers, antioxidants, heat aging stabilizers, whitening agents, antiblocking agents, bonding agents, tackifiers, viscosity modifiers, etc. Suitable crosslinking catalysts, for instance, may include organic bases, carboxylic acids, and organometallic compounds, such as organic titanates and complexes or carboxylates of lead, cobalt, iron, nickel, zinc and tin (e.g., dibutyltindilaurate, dioctyltinmaleate, dibutyltindiacetate, dibutyltindioctoate, stannous acetate, stannous octoate, lead naphthenate, zinc caprylate, cobalt naphthenate; etc.). Suitable pro-rad additives may likewise include azo compounds, organic peroxides and polyfunctional vinyl or allyl compounds such as, triallyl cyanurate, triallyl isocyanurate, pentaerthritol tetramethacrylate, glutaraldehyde, polyester acrylate oligomers (e.g., available from Sartomer under the designation CN2303), ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2, 5-di(t-butyl peroxy)hexane, lauryl peroxide, tert-butyl peracetate, azobisisobutyl nitrite, etc.

Examples of suitable tackifiers may include, for instance, hydrogenated hydrocarbon resins. REGALREZ™ hydrocarbon resins are examples of such hydrogenated hydrocarbon resins, and are available from Eastman Chemical. Other tackifiers are available from ExxonMobil under the ESCOREZ™ and OPERA™ designations, such as for example OPERA™ 100A. Viscosity modifiers may also be employed, such as polyethylene wax (e.g., EPOLENE™ C-10 from Eastman Chemical). Phosphite stabilizers (e.g., IRGAFOS available from Ciba Specialty Chemicals of Terrytown, N.Y. and DOVERPHOS available from Dover Chemical Corp. of Dover, Ohio) are exemplary melt stabilizers. In addition, hindered amine stabilizers (e.g., CHIMASSORB available from Ciba Specialty Chemicals) are exemplary heat and light stabilizers. Further, hindered phenols are commonly used as an antioxidant in the production of films.

Some suitable hindered phenols include those available from Ciba Specialty Chemicals of under the trade name "Irganox®", such as Irganox® 1076, 1010, or E 201. Moreover, bonding agents may also be added to the elastic composition to facilitate bonding to additional materials (e.g., nonwoven web). When employed, such additives (e.g., tackifier, antioxidant, stabilizer, crosslinking agents, pro-rad additives, etc.) may each be present in an amount from about 0.001 wt. % to about 25 wt. %, in some embodiments, from about 0.005 wt. % to about 20 wt. %, and in some embodiments, from 0.01 wt. % to about 15 wt. % of the elastic material.

Precursor Elastic Material

The elastic composition that contains the two different block copolymers may be incorporated into a precursor elastic material. Suitable sheet materials include, but are not limited to, films, foams, strands, nonwoven webs, and so forth. As used herein, the term "nonwoven web" generally refers to a web having a structure of individual fibers or threads which are interlaid, but not in an identifiable manner as in a knitted fabric. Examples of suitable nonwoven fabrics or webs include, but are not limited to, meltblown webs, spunbond webs, carded webs, etc. The basis weight of the nonwoven web may generally vary, such as from about 0.1 grams per square meter ("gsm") to 120 gsm, in some embodiments from about 0.5 gsm to about 70 gsm, and in some embodiments, from about 1 gsm to about 35 gsm.

As used herein, the term "meltblown web" generally refers to a nonwoven web that is formed by a process in which a molten thermoplastic material is extruded through a plurality of fine, usually circular, die capillaries as molten fibers into converging high velocity gas (e.g. air) streams that attenuate the fibers of molten thermoplastic material to reduce their diameter, which may be to microfiber diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Butin, et al., which is incorporated herein in its entirety by reference thereto for all purposes. Generally speaking, meltblown fibers may be microfibers that are substantially continuous or discontinuous, generally smaller than 10 microns in diameter, and generally tacky when deposited onto a collecting surface.

As used herein, the term "spunbond web" generally refers to a web containing small diameter substantially continuous fibers. The fibers are formed by extruding a molten thermoplastic material from a plurality of fine, usually circular, capillaries of a spinnerette with the diameter of the extruded fibers then being rapidly reduced as by, for example, eductive drawing and/or other well-known spunbonding mechanisms. The production of spunbond webs is described and illustrated, for example, in U.S. Pat. No. 4,340,563 to Appel, et al., U.S. Pat. No. 3,692,618 to Dorschner, et al., U.S. Pat. No. 3,802,817 to Matsuki, et al., U.S. Pat. No. 3,338,992 to Kinney, U.S. Pat. No. 3,341,394 to Kinney, U.S. Pat. No. 3,502,763 to Hartman, U.S. Pat. No. 3,502,538 to Levy, U.S. Pat. No. 3,542,615 to Dobo, et al., and U.S. Pat. No. 5,382,400 to Pike, et al., which are incorporated herein in their entirety by reference thereto for all purposes. Spunbond fibers are generally not tacky when they are deposited onto a collecting surface. Spunbond fibers may sometimes have diameters less than about 40 microns, and are often between about 5 to about 20 microns.

The elastic composition may be melt blended or may be dry blended such that the dry blended elastic composition can be introduced into an extruder, melted in the extruder, and extruded into a precursor sheet material of sound integrity as is known in the art. Alternatively, the elastic composition can be melt extruded and cut into pellet form, as is known in the art, for re-melting and extruding it into a precursor sheet material. Prior to crosslinking, the block copolymer composition has a relatively low viscosity and thus may be readily formed into a precursor elastic material that is subsequently crosslinked to achieve the desired elastic and mechanical properties.

In one embodiment, for example, the precursor elastic material includes a film. Any known technique may be used to form a film, including blowing, casting, flat die extruding, etc. In one particular embodiment, the film may be formed by a blown process in which a gas (e.g., air) is used to expand a bubble of a melt extruded polymer through an annular die. The bubble is then collapsed and collected in flat film form. Processes for producing blown films are described, for instance, in U.S. Pat. No. 3,354,506 to Raley; U.S. Pat. No. 3,650,649 to Schippers; and U.S. Pat. No. 3,801,429 to Schrenk et al., as well as U.S. Patent Application Publication Nos. 2005/0245162 to McCormack, et al. and 2003/0068951 to Boggs, et al., all of which are incorporated herein in their entirety by reference thereto for all purposes. Although not required, the film may be stretched to improve its properties. For example, the film may be drawn by rolls rotating at different speeds of rotation so that the sheet is stretched to the desired draw ratio in the longitudinal direction (machine direction). In addition, the uniaxially stretched film may also be oriented in the cross-machine direction to form a "biaxially stretched" film. For example, the film may be clamped at its lateral edges by chain clips and conveyed into a tenter oven. In the tenter oven, the film may be drawn in the cross-machine direction to the desired draw ratio by chain clips diverged in their forward travel. Various parameters of a stretching operation may be selectively controlled, including the draw ratio, stretching temperature, and so forth. In some embodiments, for example, the film is stretched in the machine direction at a stretch ratio of from about 1.5 to about 7.0, in some embodiments from about 1.8 to about 5.0, and in some embodiments, from about 2.0 to about 4.5. The stretch ratio may be determined by dividing the length of the stretched film by its length before stretching. The stretch ratio may also be approximately the same as the draw ratio, which may be determined by dividing the linear speed of the film upon stretching (e.g., speed of the nip rolls) by the linear speed at which the film is formed (e.g., speed of casting rolls or blown nip rolls). The film may be stretched at a temperature from about 15° C. to about 50° C., in some embodiments from about 25° C. to about 40° C., and in some embodiments, from about 30° C. to about 40° C. Preferably, the film is "cold drawn", i.e., stretched without the application of external heat (e.g., heated rolls).

The film may be a mono- or multi-layered film. Multilayer films may be prepared by co-extrusion of the layers, extrusion coating, or by any conventional layering process. Such multilayer films normally contain a base layer and skin layer, but may contain any number of layers desired. For example, the multilayer film may be formed from a base layer and one or more skin layers, wherein the base layer is formed from an elastomeric composition in accordance with the present invention. In such embodiments, the skin layer(s) may be formed from any film-forming polymer. If desired, the skin layer(s) may contain a softer, lower melting polymer or polymer blend that renders the layer(s) more suitable as heat seal bonding layers for thermally bonding the film to a nonwoven web facing. In most embodiments, the skin layer(s) are formed from an olefin polymer. Additional film-forming polymers that may be suitable for use with the present invention, alone or in combination with other polymers, include ethylene vinyl acetate, ethylene ethyl acrylate, ethylene acrylic acid, ethylene methyl acrylate, ethylene normal butyl acrylate, nylon, ethylene vinyl alcohol, polystyrene, polyurethane, and so forth.

In another embodiment of the present invention, the precursor elastic material may include a plurality of strands. The number of strands may vary as desired, such as from 5 to about 20, in some embodiments from about 7 to about 18, and in some embodiments, from about 8 to 15 strands per cross-directional inch. The strands may have a circular cross-section, but may alternatively have other cross-sectional geometries such as elliptical, rectangular as in ribbon-like strands, triangular, multi-lobal, etc. The diameter of the strands (the widest cross-sectional dimension) may vary as desired, such as within a range of from 0.1 to about 4 millimeters, in some embodiments from about 0.2 to about 2.5 millimeters, and in some embodiments, from 0.5 to about 2 millimeters. Further, the strands may generally be arranged in any direction or pattern. For example, in one embodiment, the strands are arranged in a direction that is substantially parallel to the machine direction and are desirably spaced apart from each other across the cross machine direction at similar intervals. The strands may be substantially continuous in length so that they are in the form of filaments. Such filaments may be produced using any of a variety of known techniques, such as by melt extruding a polymer from a die having a series of extrusion capillaries arranged in a row. As is well known in the art, meltblown dies may be suitable for forming the filaments, except that the high velocity gas streams used in fiber attenuation are generally not employed. Rather, the molten polymer extrudate is pumped from the die capillaries and allowed to extend away from the die under the impetus of gravity.

If desired, a layer of the aforementioned strands may also be laminated to an additional layer (e.g., meltblown web) to help secure the strands to a facing so that they are less likely to loosen during use. Examples of such laminates are described in more detail, for instance, in U.S. Pat. No. 5,385,775 to Wright and U.S. Patent Application Publication No. 2005/0170729 to Stadelman, et al., which are incorporated herein in their entirety by reference thereto for all purposes. In one embodiment, the strands contain the block copolymer composition of the present invention and the meltblown web contains a polyolefin.

Crosslinking

After formation of the precursor elastic material, the elastic copolymers in the precursor elastic material may be crosslinked to improve elastic properties. Crosslinking is typically achieved through the formation of free radicals (unpaired electrons) that link together to form a plurality of carbon-carbon covalent bonds in the conjugated diene midblocks. The use of conjugated diene midblocks in the copolymer of the present invention thus provides a large number of crosslinking sites.

The elastic copolymers of the present invention may be crosslinked after being incorporated into the precursor elastic material to provide the polymer and material with elastic characteristics. Crosslinking may be achieved through the formation of free radicals (unpaired electrons) that link together to form a plurality of carbon-carbon covalent bonds. Free radical formation may be accomplished in a variety of ways, such as through electromagnetic radiation, either alone or in the presence of pro-rad additives, such as described above. More specifically, crosslinking may be induced by subjecting the precursor elastic material to electromagnetic radiation. Some suitable examples of electromagnetic radiation that may be used in the present invention include, but are not limited to, ultraviolet light, electron beam radiation, natural and artificial radio isotopes (e.g., $\alpha$, $\beta$, and $\gamma$ rays), x-rays, neutron beams, positively-charged beams, laser beams, and so forth. Electron beam radiation, for instance, involves the production of accelerated electrons by an electron beam device. Electron beam devices are generally well known in the art. For instance, in one embodiment, an electron beam device may be used that is available from Energy Sciences, Inc., of Woburn, Mass. under the name "Microbeam LV." Other examples of suitable electron beam devices are described in U.S. Pat. No. 5,003,178 to Livesay; U.S. Pat. No. 5,962,995 to Avnery; U.S. Pat. No. 6,407,492 to Avnery, et al., which are incorporated herein in their entirety by reference thereto for all purposes.

When supplying electromagnetic radiation, it is generally desired to selectively control various parameters of the radiation to enhance the degree of crosslinking. For example, one parameter that may be controlled is the wavelength $\lambda$ of the electromagnetic radiation. Specifically, the wavelength $\lambda$ of the electromagnetic radiation varies for different types of radiation of the electromagnetic radiation spectrum. Although not required, the wavelength $\lambda$ of the electromagnetic radiation used in the present invention is generally about 1000 nanometers or less, in some embodiments about 100 nanometers or less, and in some embodiments, about 1 nanometer or less. Electron beam radiation, for instance, typically has a wavelength $\lambda$ of about 1 nanometer or less. Besides selecting the particular wavelength $\lambda$ of the electromagnetic radiation, other parameters may also be selected to optimize the degree of crosslinking. For example, higher dosage and energy levels of radiation will typically result in a higher degree of crosslinking; however, it is generally desired that the materials not be "overexposed" to radiation. Such overexposure may result in an unwanted level of product degradation. Thus, in some embodiments, the total dosage employed (in one or multiple steps) may range from about 1 megarad (Mrad) to about 30 Mrads, in some embodiments, from about 3 Mrads to about 25 Mrads, and in some embodiments, from about 5 to about 15 Mrads. In addition, the energy level may range from about 0.05 megaelectron volts (MeV) to about 600 MeV.

It should be understood, however, that the actual dosage and/or energy level required depends on the type of polymers and electromagnetic radiation. Specifically, certain types of polymers may tend to form a lesser or greater number of crosslinks, which will influence the dosage and energy of the radiation utilized. Likewise, certain types of electromagnetic radiation may be less effective in crosslinking the polymer, and thus may be utilized at a higher dosage and/or energy level. For instance, electromagnetic radiation that has a relatively high wavelength (lower frequency) may be less efficient in crosslinking the polymer than electromagnetic radiation having a relatively low wavelength (higher frequency). Accordingly, in such instances, the desired dosage and/or energy level may be increased to achieve the desired degree of crosslinking.

Upon crosslinking, a three-dimensional crosslinked network is formed that provides the material with elasticity in the machine direction, cross-machine direction, or both. In addition to forming a three-dimensional elastomer network, crosslinking may also provide a variety of other benefits. Lotions used to enhance skin care, for instance, may contain petroleum-based components and/or other components that are compatible with thermoplastics polymers. If the lotions come into sufficient contact with an elastic material, its performance may be significantly degraded. In this regard, the crosslinked copolymers may exhibit improvement in lotion degradation resistance. Furthermore, certain types of crosslinking techniques (e.g., electron beam radiation) may generate sufficient heat to effectively "heat shrink" the elastic material and provide it with additional latent stretchability. A separate heat activation step may also be employed to further enhance the heat shrinkage performance of the elastic material. Such an additional heat activation step may occur before and/or after crosslinking.

Upon crosslinking, the elastic component containing the crosslinked elastic copolymers may have improved tensile strength. In one embodiment, the elastic component may have a machine direction tensile stress greater than about 1600 psi. In another embodiment, the elastic component may have a cross direction tensile stress greater than about 2700 psi.

Nonwoven Laminates

As mentioned above, the elastic material may be incorporated into a nonwoven web material. This may be accomplished by blending the elastic component with other materials (e.g., polypropylene). Alternatively, one or more nonwoven web facings may also be laminated to the elastic material to reduce the coefficient of friction and enhance the cloth-like feel of its surface. The basis weight of the nonwoven web facing may generally vary, such as from about 5 grams per square meter ("gsm") to 120 gsm, in some embodiments from about 8 gsm to about 70 gsm, and in some embodiments, from about 10 gsm to about 35 gsm. When multiple nonwoven web facings, such materials may have the same or different basis weights.

Exemplary polymers for use in forming nonwoven web facings may include, for instance, polyolefins, e.g., polyethylene, polypropylene, polybutylene, etc.; polytetrafluoroethylene; polyesters, e.g., polyethylene terephthalate and so forth; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; polyurethanes; polylactic acid; copolymers thereof; and so forth. If desired, biodegradable polymers, such as those described above, may also be employed. Synthetic or natural cellulosic polymers may also be used, including but not limited to, cellulosic esters; cellulosic ethers; cellulosic nitrates; cellulosic acetates; cellulosic acetate butyrates; ethyl cellulose; regenerated celluloses, such as viscose, rayon, and so forth. It should be noted that the polymer(s) may also contain other additives, such as processing aids or treatment compositions to impart desired properties to the fibers, residual amounts of solvents, pigments or colorants, and so forth.

Monocomponent and/or multicomponent fibers may be used to form the nonwoven web facing. Monocomponent fibers are generally formed from a polymer or blend of polymers extruded from a single extruder. Multicomponent fibers are generally formed from two or more polymers (e.g., bicomponent fibers) extruded from separate extruders. The polymers may be arranged in substantially constantly positioned distinct zones across the cross-section of the fibers. The components may be arranged in any desired configuration, such as sheath-core, side-by-side, pie, island-in-the-sea, three island, bull's eye, or various other arrangements known in the art. Various methods for forming multicomponent fibers are described in U.S. Pat. No. 4,789,592 to Taniguchi et al. and U.S. Pat. No. 5,336,552 to Strack, et al., U.S. Pat. No. 5,108,820 to Kaneko, et al., U.S. Pat. No. 4,795,668 to Kruege, et al., U.S. Pat. No. 5,382,400 to Pike, et al., U.S. Pat. No. 5,336,552 to Strack, et al., and U.S. Pat. No. 6,200,669 to Marmon, et al., which are incorporated herein in their entirety by reference thereto for all purposes. Multicomponent fibers having various irregular shapes may also be formed, such as described in U.S. Pat. No. 5,277,976 to Hogle, et al., U.S. Pat. No. 5,162,074 to Hills, U.S. Pat. No. 5,466,410 to Hills, U.S. Pat. No. 5,069,970 to Largman, et al., and U.S. Pat. No. 5,057,368 to Largman, et al., which are incorporated herein in their entirety by reference thereto for all purposes.

Although any combination of polymers may be used, the polymers of the multicomponent fibers are typically made from thermoplastic materials with different glass transition or melting temperatures where a first component (e.g., sheath) melts at a temperature lower than a second component (e.g., core). Softening or melting of the first polymer component of the multicomponent fiber allows the multicomponent fibers to form a tacky skeletal structure, which upon cooling, stabilizes the fibrous structure. For example, the multicomponent fibers may have from about 5% to about 80%, and in some embodiments, from about 10% to about 60% by weight of the low melting polymer. Further, the multicomponent fibers may have from about 95% to about 20%, and in some embodiments, from about 90% to about 40%, by weight of the high melting polymer. Some examples of known sheath-core bicomponent fibers available from KoSa Inc. of Charlotte, N.C. under the designations T-255 and T-256, both of which use a polyolefin sheath, or T-254, which has a low melt co-polyester sheath. Still other known bicomponent fibers that may be used include those available from the Chisso Corporation of Moriyama, Japan or Fibervisions LLC of Wilmington, Del.

Fibers of any desired length may be employed, such as staple fibers, continuous fibers, etc. In one particular embodiment, for example, staple fibers may be used that have a fiber length in the range of from about 1 to about 150 millimeters, in some embodiments from about 5 to about 50 millimeters, in some embodiments from about 10 to about 40 millimeters, and in some embodiments, from about 10 to about 25 millimeters. Although not required, carding techniques may be employed to form fibrous layers with staple fibers as is well known in the art. For example, fibers may be formed into a carded web by placing bales of the fibers into a picker that separates the fibers. Next, the fibers are sent through a combing or carding unit that further breaks apart and aligns the fibers in the machine direction so as to form a machine direction-oriented fibrous nonwoven web. The carded web may then be bonded using known techniques to form a bonded carded nonwoven web.

If desired, the nonwoven web facing used to form the nonwoven composite may have a multi-layer structure. Suitable multi-layered materials may include, for instance, spunbond/meltblown/spunbond (SMS) laminates and spunbond/meltblown (SM) laminates. Various examples of suitable SMS laminates are described in U.S. Pat. No. 4,041,203 to Brock et al.; U.S. Pat. No. 5,213,881 to Timmons, et al.; U.S. Pat. No. 5,464,688 to Timmons, et al.; U.S. Pat. No. 4,374,888 to Bornslaeger; U.S. Pat. No. 5,169,706 to Collier, et al.; and U.S. Pat. No. 4,766,029 to Brock et al., which are incorporated herein in their entirety by reference thereto for all purposes. In addition, commercially available SMS laminates may be obtained from Kimberly-Clark Corporation under the designations Spunguard® and Evolution®.

Another example of a multi-layered structure is a spunbond web produced on a multiple spin bank machine in which a spin bank deposits fibers over a layer of fibers deposited from a previous spin bank. Such an individual spunbond nonwoven web may also be thought of as a multi-layered structure. In this situation, the various layers of deposited fibers in the nonwoven web may be the same, or they may be different in basis weight and/or in terms of the composition, type, size, level of crimp, and/or shape of the fibers produced. As another example, a single nonwoven web may be provided as two or more individually produced layers of a spunbond web, a carded web, etc., which have been bonded together to form the nonwoven web. These individually produced layers may differ in terms of production method, basis weight, composition, and fibers as discussed above.

A nonwoven web facing may also contain an additional fibrous component such that it is considered a composite. For example, a nonwoven web may be entangled with another fibrous component using any of a variety of entanglement techniques known in the art (e.g., hydraulic, air, mechanical, etc.). In one embodiment, the nonwoven web is integrally entangled with cellulosic fibers using hydraulic entanglement. A typical hydraulic entangling process utilizes high pressure jet streams of water to entangle fibers to form a highly entangled consolidated fibrous structure, e.g., a nonwoven web. Hydraulically entangled nonwoven webs of staple length and continuous fibers are disclosed, for example, in U.S. Pat. No. 3,494,821 to Evans and U.S. Pat. No. 4,144,370 to Boulton, which are incorporated herein in their entirety by reference thereto for all purposes. Hydraulically entangled composite nonwoven webs of a continuous fiber nonwoven web and a pulp layer are disclosed, for example, in U.S. Pat. No. 5,284,703 to Everhart, et al. and U.S. Pat. No. 6,315,864 to Anderson, et al., which are incorporated herein in their entirety by reference thereto for all purposes. The fibrous component of the composite may contain any desired amount of the resulting substrate. The fibrous component may contain greater than about 50% by weight of the composite, and in some embodiments, from about 60% to about 90% by weight of the composite. Likewise, the nonwoven web may contain less than about 50% by weight of the composite, and in some embodiments, from about 10% to about 40% by weight of the composite.

The nonwoven web facing may be necked in one or more directions prior to lamination to the film of the present invention. Suitable necking techniques are described in U.S. Pat. Nos. 5,336,545, 5,226,992, 4,981,747 and 4,965,122 to Morman, as well as U.S. Patent Application Publication No. 2004/0121687 to Morman, et al. Alternatively, the nonwoven web may remain relatively inextensible in a direction prior to lamination to the film. In such embodiments, the nonwoven web may be optionally stretched in one or more directions subsequent to lamination to the elastic material.

Any of a variety of techniques may be employed to laminate the layers together, including adhesive bonding; thermal bonding; ultrasonic bonding; microwave bonding; extrusion coating; and so forth. In one particular embodiment, nip rolls apply a pressure to the precursor elastic material (e.g., film) and nonwoven facing(s) to thermally bond the materials together. The rolls may be smooth and/or contain a plurality of raised bonding elements. In one embodiment, the rolls are smooth chill rolls and the nonwoven facing materials are laminated to the film by extrusion coating the film between two facing materials as the film and facing materials pass through the nip between the chilled rolls. Adhesives may also be employed, such as Rextac 2730 and 2723 available from Huntsman Polymers of Houston, Tex., as well as adhesives available from Bostik Findley, Inc, of Wauwatosa, Wis. The type and basis weight of the adhesive used will be determined on the elastic attributes desired in the final composite and end use. For instance, the basis weight of the adhesive may be from about 1.0 to about 3.0 gsm. The adhesive may be applied to the nonwoven web facings and/or the elastic material prior to lamination using any known technique, such as slot or melt spray adhesive systems. During lamination, the elastic material may in a stretched or relaxed condition depending on the desired properties of the resulting composite.

When the elastic material is a film, the film may be suitably be apertured by any suitable method. For example, the elastic film in a film/nonwoven laminate may be an apertured film. The elastic film may be apertured during the process of laminating the film to a nonwoven sheet material. Apertured films in film/nonwoven laminates are disclosed, for example, in U.S. Pat. No. 7,803,244 to Siqueira et al., which is incorporated herein in its entirety by reference thereto for all purposes.

Figure 1:
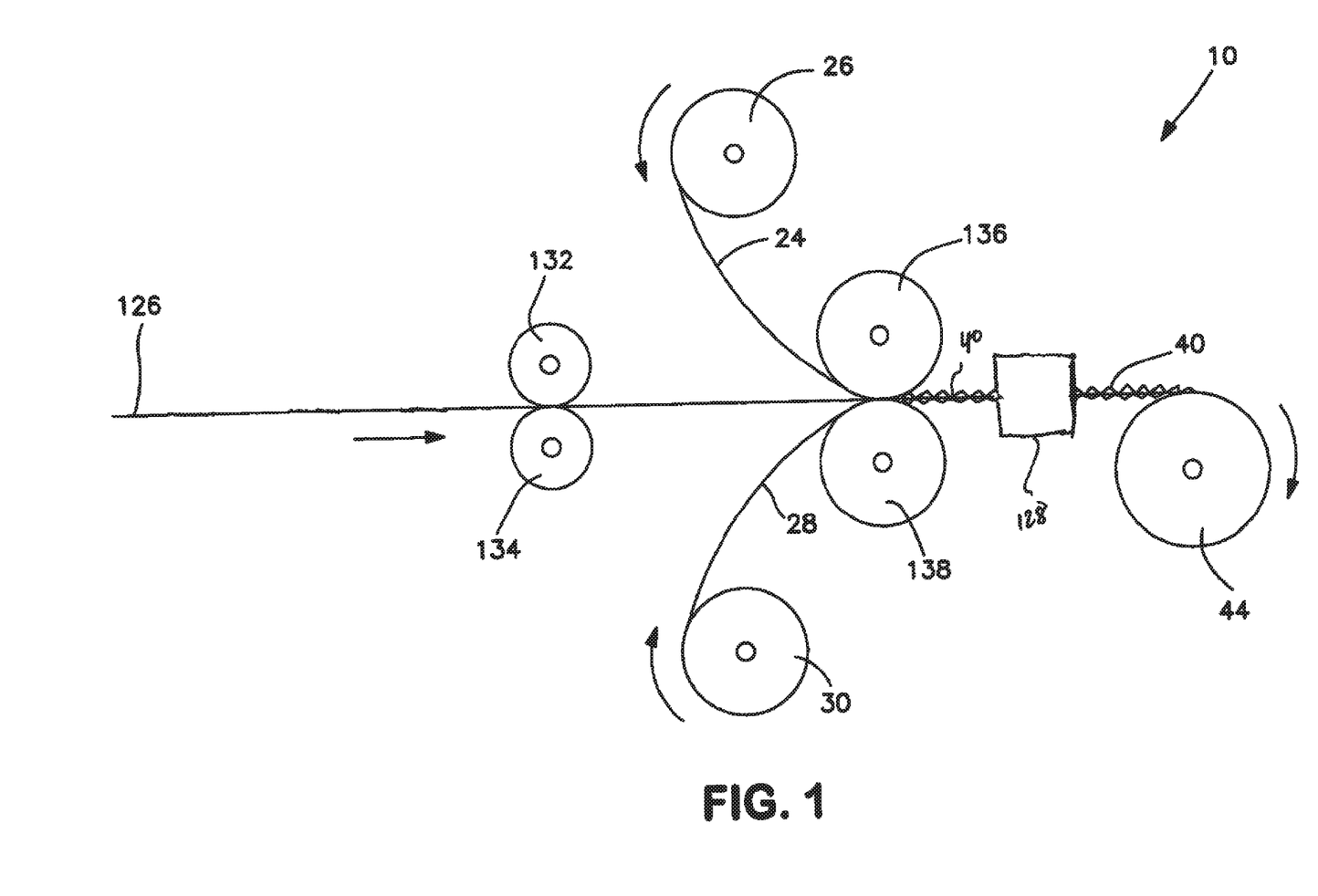
FIG. 1 is a schematic illustration of a method for forming a composite in accordance with one embodiment of the present invention.

The lamination of the nonwoven web facing(s) and elastic material(s) may occur before and/or after crosslinking of the elastic copolymers. In one embodiment, for example, a precursor elastic material is initially laminated to a nonwoven web facing, and the resulting composite is subsequently subjected to electromagnetic radiation of a certain dosage. FIG. 1 schematically illustrates an exemplary process 10 for forming a stretch-bonded composite in this manner. Initially, a thermoplastic precursor layer 126 is stretched between a first set of nip rolls 132 and 134, and a second set of nip rollers 136 and 138. To induce stretching, the second set of nip rolls may turn at a surface speed faster than the first set of nip rolls. Nonwoven facing layers 24 and 28 are also unwound from storage rolls 26 and 30 and combined with the stretched precursor layer 126 to form a composite 40 between nip rolls 136 and 138, while the nonwoven layers 24 and 28 are relaxed. The layers may be combined with the aid of an adhesive applied to the nonwoven layers or the precursor layer, or with the aid of heat supplied from roll 136 and/or 138.

After the composite 40 is formed, it then passes through a crosslinking station 128, thereby forming a composite that may be wound onto a roll 44. The composite may be elastic in the machine direction, cross-machine direction, or both. Although not shown, various additional potential processing and/or finishing steps known in the art, such as slitting, treating, printing graphics, etc., may be performed without departing from the spirit and scope of the invention. For instance, the composite may optionally be mechanically stretched in the cross-machine and/or machine directions to enhance extensibility. In one embodiment, the composite may be coursed through two or more rolls that have grooves in the CD and/or MD directions. As used herein, the terms "machine direction" or "MD" generally refer to the direction in which a material is produced. The terms "cross-machine direction" or "CD" refer to the direction perpendicular to the machine direction. Dimensions measured in the cross-machine direction are referred to as "width" dimension, while dimensions measured in the machine direction are referred to as "length" dimensions.

Such grooved satellite/anvil roll arrangements are described in U.S. Patent Application Publication Nos. 2004/0110442 to Rhim, et al. and 2006/0151914 to Gerndt, et al., which are incorporated herein in their entirety by reference thereto for all purposes. For instance, the composite may be coursed through two or more rolls that have grooves in the CD and/or MD directions. The grooved rolls may be constructed of steel or other hard material (such as a hard rubber). If desired, heat may be applied by any suitable method known in the art, such as heated air, infrared heaters, heated nipped rolls, or partial wrapping of the composite around one or more heated rolls or steam canisters, etc. Heat may also be applied to the grooved rolls themselves. It should also be understood that other grooved roll arrangement are equally suitable, such as two grooved rolls positioned immediately adjacent to one another. Besides grooved rolls, other techniques may also be used to mechanically stretch the composite in one or more directions. For example, the composite may be passed through a tenter frame that stretches the composite. Such tenter frames are well known in the art and described, for instance, in U.S. Patent Application Publication No. 2004/0121687 to Morman, et al. The composite may also be necked. Suitable techniques necking techniques are described in U.S. Pat. Nos. 5,336,545, 5,226,992, 4,981,747 and 4,965,122 to Morman, as well as U.S. Patent Application Publication No. 2004/0121687 to Morman, et al., all of which are incorporated herein in their entirety by reference thereto for all purposes.

Products

The elastic material of the present invention may have a wide variety of applications, but is particularly useful as a component of an absorbent article. As used herein, the term "absorbent article" generally refers to any article capable of absorbing water or other fluids. Examples of some absorbent articles include, but are not limited to, personal care absorbent articles, such as diapers, training pants, absorbent underpants, incontinence articles, feminine hygiene products (e.g., sanitary napkins), swim wear, baby wipes, and so forth; medical absorbent articles, such as garments, fenestration materials, underpads, bedpads, bandages, absorbent drapes, and medical wipes; food service wipers; clothing articles; and so forth. Materials and processes suitable for forming such absorbent articles are well known to those skilled in the art.

Although not required, a precursor elastic material may be incorporated into the absorbent article and subsequently crosslinked. In this manner, the material is not highly elastic prior to crosslinking and is thus more dimensionally stable than highly elastic materials. This decreases the need for maintaining the material in a mechanically stretched condition during attachment to other components of the absorbent article and thus provides greater freedom in the location and manner in which the components are attached together. Of course, the precursor elastic material may also be crosslinked prior to incorporation into the absorbent article, such as described above and illustrated in FIG. 1.

Figure 2:
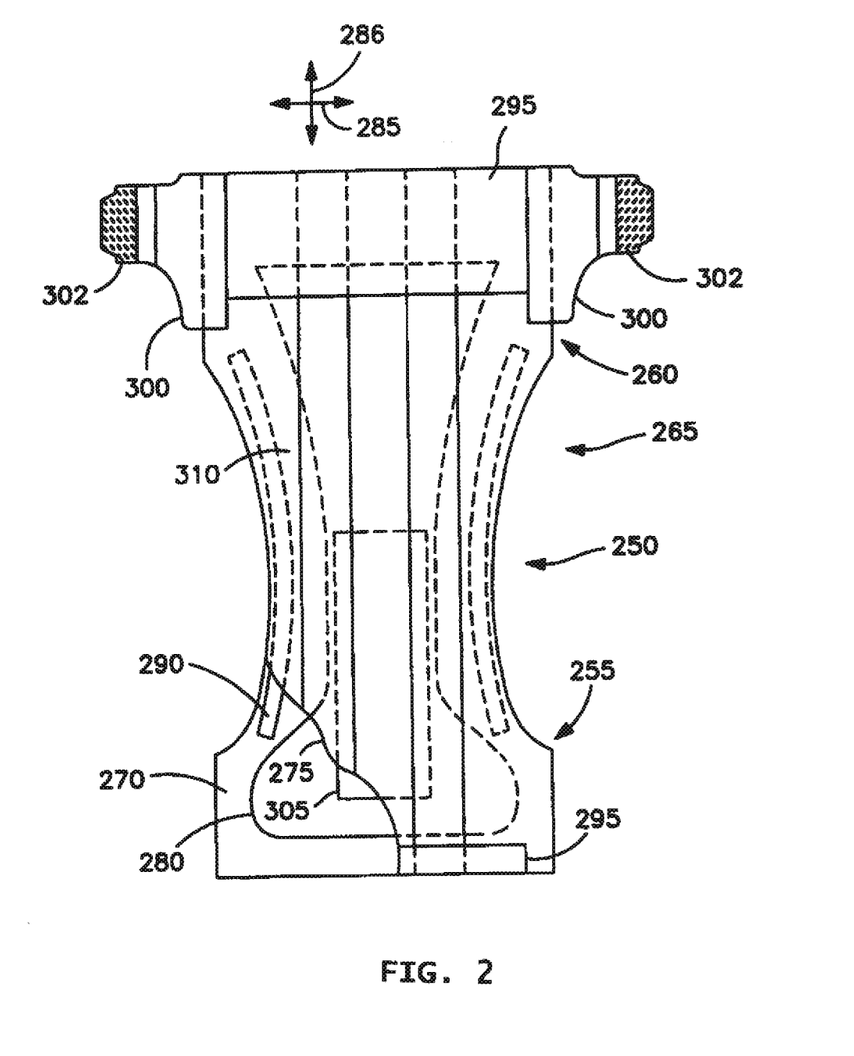
FIG. 2 is a perspective view of an absorbent article that may be formed in accordance with one embodiment of the present invention.

The absorbent article normally includes a substantially liquid-impermeable layer (e.g., outer cover), a liquid-permeable layer (e.g., bodyside liner, surge layer, etc.), an absorbent core, and various other optional components. As is well known in the art, a variety of absorbent article components may possess elastic characteristics, such as waistbands, leg/cuff gasketing, ears, side panels, outer covers, and so forth. The crosslinked elastic material of the present invention may be employed for use in any of such components. Referring to FIG. 2, for example, one embodiment of a disposable diaper 250 is shown that generally defines a front waist section 255, a rear waist section 260, and an intermediate section 265 that interconnects the front and rear waist sections. The front and rear waist sections 255 and 260 include the general portions of the diaper which are constructed to extend substantially over the wearer's front and rear abdominal regions, respectively, during use. The intermediate section 265 of the diaper includes the general portion of the diaper that is constructed to extend through the wearer's crotch region between the legs. Thus, the intermediate section 265 is an area where repeated liquid surges typically occur in the diaper.

The diaper 250 includes, without limitation, an outer cover, or backsheet 270, a liquid permeable bodyside liner, or topsheet, 275 positioned in facing relation with the backsheet 270, and an absorbent core body, or liquid retention structure, 280, such as an absorbent pad, which is located between the backsheet 270 and the topsheet 275. The backsheet 270 defines a length, or longitudinal direction 286, and a width, or lateral direction 285 which, in the illustrated embodiment, coincide with the length and width of the diaper 250. The liquid retention structure 280 generally has a length and width that are less than the length and width of the backsheet 270, respectively. Thus, marginal portions of the diaper 250, such as marginal sections of the backsheet 270 may extend past the terminal edges of the liquid retention structure 280. In the illustrated embodiments, for example, the backsheet 270 extends outwardly beyond the terminal marginal edges of the liquid retention structure 280 to form side margins and end margins of the diaper 250. The topsheet 275 is generally coextensive with the backsheet 270 but may optionally cover an area that is larger or smaller than the area of the backsheet 270, as desired.

To provide improved fit and to help reduce leakage of body exudates from the diaper 250, the diaper side margins and end margins may be elasticized with suitable elastic members, as further explained below. For example, as representatively illustrated in FIG. 2, the diaper 250 may include leg/cuff gasketing 290 constructed to operably tension the side margins of the diaper 250 and closely fit around the legs of the wearer to reduce leakage and provide improved comfort and appearance. Waistbands 295 are employed that provide a resilient, comfortably close fit around the waist of the wearer. The crosslinked elastic material of the present invention is suitable for use as the leg/cuff gasketing 290 and/or waistbands 295. Exemplary of such materials are composite sheets that either comprise or are adhered to the backsheet, such that elastic constrictive forces are imparted to the backsheet 270.

As is known, fastening means, such as hook and loop fasteners, may be employed to secure the diaper 250 on a wearer. Alternatively, other fastening means, such as buttons, pins, snaps, adhesive tape fasteners, cohesives, fabric-and-loop fasteners, or the like, may be employed. In the illustrated embodiment, the diaper 250 includes a pair of side panels 300 (or ears) to which the fasteners 302, indicated as the hook portion of a hook and loop fastener, are attached. Generally, the side panels 300 are attached to the side edges of the diaper in one of the waist sections 255, 260 and extend laterally outward therefrom. The side panels 300 may contain the elastic material of the present invention. Examples of absorbent articles that include side panels and selectively configured fastener tabs are described in PCT Patent Application WO 95/16425 to Roessler; U.S. Pat. No. 5,399,219 to Roessler et al.; U.S. Pat. No. 5,540,796 to Fries; and U.S. Pat. No. 5,595,618 to Fries, each of which is incorporated herein in its entirety by reference thereto for all purposes.

The diaper 250 may also include a surge management layer 305, located between the topsheet 275 and the liquid retention structure 280, to rapidly accept fluid exudates and distribute the fluid exudates to the liquid retention structure 280 within the diaper 250. The diaper 250 may further include a ventilation layer (not illustrated), also called a spacer, or spacer layer, located between the liquid retention structure 280 and the backsheet 270 to insulate the backsheet 270 from the liquid retention structure 280 to reduce the dampness of the garment at the exterior surface of a breathable outer cover, or backsheet, 270. Examples of suitable surge management layers 305 are described in U.S. Pat. No. 5,486,166 to Bishop and U.S. Pat. No. 5,490,846 to Ellis.

As representatively illustrated in FIG. 2, the disposable diaper 250 may also include a pair of containment flaps 310 which are configured to provide a barrier to the lateral flow of body exudates. The containment flaps 310 may be located along the laterally opposed side edges of the diaper adjacent the side edges of the liquid retention structure 280. Each containment flap 310 typically defines an unattached edge that is configured to maintain an upright, perpendicular configuration in at least the intermediate section 265 of the diaper 250 to form a seal against the wearer's body. The containment flaps 310 may extend longitudinally along the entire length of the liquid retention structure 280 or may only extend partially along the length of the liquid retention structure. When the containment flaps 310 are shorter in length than the liquid retention structure 280, the containment flaps 310 can be selectively positioned anywhere along the side edges of the diaper 250 in the intermediate section 265. Such containment flaps 310 are generally well known to those skilled in the art. For example, suitable constructions and arrangements for containment flaps 310 are described in U.S. Pat. No. 4,704,116 to Enloe.

The diaper 250 may be of various suitable shapes. For example, the diaper may have an overall rectangular shape, T-shape or an approximately hour-glass shape. In the shown embodiment, the diaper 250 has a generally I-shape. Other suitable components which may be incorporated on absorbent articles of the present invention may include waist flaps and the like which are generally known to those skilled in the art. Examples of diaper configurations suitable for use in connection with the elastic materials of the present invention that may include other components suitable for use on diapers are described in U.S. Pat. No. 4,798,603 to Meyer, et al.; U.S. Pat. No. 5,176,668 to Bernardin; U.S. Pat. No. 5,176,672 to Bruemmer, et al.; U.S. Pat. No. 5,192,606 to Proxmire, et al.; and U.S. Pat. No. 5,509,915 to Hanson, et al., which are incorporated herein in their entirety by reference thereto for all purposes.

The various regions and/or components of the diaper 250 may be assembled together using any known attachment mechanism, such as adhesive, ultrasonic, thermal bonds, etc. Suitable adhesives may include, for instance, hot melt adhesives, pressure-sensitive adhesives, and so forth. When utilized, the adhesive may be applied as a uniform layer, a patterned layer, a sprayed pattern, or any of separate lines, swirls or dots. In the illustrated embodiment, for example, the topsheet 275 and backsheet 270 may be assembled to each other and to the liquid retention structure 280 with lines of adhesive, such as a hot melt, pressure-sensitive adhesive. Similarly, other diaper components, such as the leg/cuff gasketing 290, waistband 295, fastening members 302, and surge layer 305 may be assembled into the article by employing the above-identified attachment mechanisms.

Although various configurations of a diaper have been described above, it should be understood that other diaper and absorbent article configurations are also included within the scope of the present invention. In addition, the present invention is by no means limited to diapers. In fact, any other absorbent article may be formed in accordance with the present invention, including, but not limited to, other personal care absorbent articles, such as training pants, absorbent underpants, adult incontinence products, feminine hygiene products (e.g., sanitary napkins), swim wear, baby wipes, and so forth; medical absorbent articles, such as garments, fenestration materials, underpads, bandages, absorbent drapes, and medical wipes; food service wipers; clothing articles; and so forth. Several examples of such absorbent articles are described in U.S. Pat. No. 5,649,916 to DiPalma, et al.; U.S. Pat. No. 6,110,158 to Kielpikowski; U.S. Pat. No. 6,663,611 to Blaney, et al., which are incorporated herein in their entirety by reference thereto for all purposes. Still other suitable articles are described in U.S. Patent Application Publication No. 2004/0060112 A1 to Fell et al., as well as U.S. Pat. No. 4,886,512 to Damico et al.; U.S. Pat. No. 5,558,659 to Sherrod et al.; U.S. Pat. No. 6,888,044 to Fell et al.; and U.S. Pat. No. 6,511,465 to Freiburger et al., all of which are incorporated herein in their entirety by reference thereto for all purposes. Of course, the elastic material is versatile and may also be incorporated into a wide variety of other types of articles. For example, the elastic material may be incorporated into a medical garment, such as gowns, caps, drapes, gloves, facemasks, etc.; industrial workwear garment, such as laboratory coats, coveralls, etc.; and so forth.

The present invention may be better understood with reference to the following examples.

EXAMPLES

All stress-elongation mechanical tests of the samples were performed using a MTS Sintech 1/s frame. The film samples were cut using a Type I "dog bone" die, specified in ASTM D638 tensile test method. The film sample was clamped into the jaws of the Sintech 1/S testing frame, set at a 2" grip-to-grip distance. The displacement of the crosshead was set at a speed of 2"/min. The film samples were stretched to failure (break) at room temperature (about 20° C.). For the laminates, a 3"×7" specimen was used to determine their tensile properties. The crosshead speed was set at 20"/min. The laminate samples were stretched to failure (break) at room temperature (about 20° C.). The stress and elongation were calculated using knowledge of the initial length, final length, initial width, and initial thickness of the samples. Thickness is measured at 0.05 psi with a Starret-type bulk tester. The foot of the bulk tester is a small acrylic cylinder measuring 3" wide by 0.5 inches in thickness.

The stress relaxation testing was executed using a MTS Sintech 1/s frame equipped with an environmental chamber. The environmental chamber was set at 100° F. to represent body temperature. For films and laminates, a 3"×7" specimen was clamped into jaws set at a 3-inch grip-to-grip distance. The material was then stretched to a length of 4.5 inches (50% elongation). The load loss at body temperature was then measured for 12 hours. The slope (slope obtained by linear regression of log(load) vs. log(time)) and load loss (100×(initial load minus final load)/initial load) are calculated and reported.

To measure hysteresis, the film and laminate samples (3"×7" specimens) were elongated to 100%, based on a 3 inch gage length at a crosshead speed of 20 in/min. After reaching the maximum strain, the specimen is immediately returned to 0 load also at a crosshead speed of 20 in/min. Hysteresis is calculated as the area under the loading curve minus the area under the unloading curve divided by the area under the loading curve and is expressed in %. A perfect elastomer would exhibit a hysteresis of 0%.

Complex viscosity was measured in a rheometer with parallel plate geometry at 1 Hz and 10% constant strain at 356° F. for 60 minutes in an air environment. A gap setting of 1 mm was used for these measurements. The viscosity stability is expressed as the time at which tan delta=1, which is understood as the time at which crosslinking occurs.

To prepare the samples for the complex viscosity measurements, approximately 10 to 20 wt. % of the component styrenic block copolymers were dissolved in tetrahydrofuran (THF) at room temperature and transferred into a Petri dish. The Petri dishes were then left in a vacuum oven at 37° C. to remove the THF. One millimeter thick samples in the form of a circular disk were removed from the Petri dish. Circular disks (25 mm diameter) were stenciled out from the large circular disk for the rheological measurements.

Dynamic rheological measurements in the oscillatory mode were made on an Anton Parr Physica MCR 301 rheometer. The rheometer equipped with parallel plates fixture was used to do the measurement and acquire data. The circular disk is placed in between the parallel plates. The sample is then heated to 356° F. and the measurements were taken at a constant strain of 10% and at a frequency of 1 Hz in air as a function of time. Complex viscosity (Pascal-sec), storage modulus (G'), loss modulus (G") and tan delta (tan delta defined as G"/G'). Storage modulus is a measure of the deformation energy stored in a sample during the shearing process and relates to the elastic nature of the material. The loss modulus is a measure of the energy lost during the deformation process and is related to the viscous component of the material. The magnitude of tan delta is a measure of the degree of elasticity. A tan delta of 0 implies elastic and ∞ implies purely viscous. A tan delta of 1 implies the viscous and elastic behavior is perfectly balanced.

In the cross-linking process, the interval in which G">G' is referred to as the sol state (liquid phase) and the duration in which G'>G" is referred to as the gel state (solid phase). The point at which G'=G" (tan delta=1) is the sol/gel transition point, also called gel point. Thus the time at which tan delta=1 is considered as the time at which the material is crosslinked.

In the examples, the styrenic block copolymer compositions were extruded into a film using a single screw extruder with a temperature profile of 350-400° F., at a melt temperature of about 400° F. The resulting elastic films were cast into a nip formed between two chill rolls set to about 40° F. To form the laminates, 15 gsm polyethylene spunbond facings were fed into the nip on each side of the film to form nonwoven/film/nonwoven laminates. The laminates were subsequently fed through grooved rollers. To crosslink the films, the film samples and laminates were subjected to electron beam radiation prior to groove rolling using Advanced Electron Beam pilot line equipment, which may be operated at a voltage range from 80 kV to 150 kV, at a depth of 150 microns, density of 1 g/cc, and a dosage range of 1-25 Mrads depending on speed.

Examples 1 and 1A include films made from an elastomer composition in which 99 wt. % of a styrene-isoprene/butadiene-styrene copolymer (Kraton D1171) was blended with 0.5 wt. % Irganox 1010 and 0.5 wt. % Irgafos 168 and made into a film. Example 1 is an uncrosslinked film, while Example 1A is a crosslinked film. Tensile properties of the films and film/nonwoven laminates made as described above are provided in Tables 1 and 2. In this elastomer composition, it is noted that the % butadiene is about 24%. While this elastomer composition has stable melt viscosity as indicated below, it is noted that the tensile strengths of these samples are generally lower as compared to Examples 2 and 2A.

Example 2 and 2A include films made from an elastomer composition in which 59 wt. % styrene-isoprene/butadiene-styrene copolymer (Kraton D1171) and 40 wt. % styrene-butadiene-styrene (Kraton D1102) were blended with 0.5 wt. % Irganox 1010, 0.5 wt. % Irgafos 168. Example 2 is an uncrosslinked film, while Example 2A is a crosslinked film. Tensile properties of the films and film/nonwoven laminates made as described above are provided in Tables 1 and 2. The butadiene in this formulation is about 53%. It is noted that the films and laminates in this Example have higher tensile strengths than those of Examples 1 and 1A.

Various blends of styrene-isoprene/butadiene-styrene copolymer (Kraton D1171) and styrene-butadiene-styrene (Kraton D1102) were subjected to rheology testing as described above. Results are provided in Table 3. Higher values for the time at which tan delta equals 1 indicate improved viscosity stability. It is noted that viscosity stability improves as the styrene-isoprene/butadiene-styrene copolymer content increases. The dashes in Table 3 indicate that after 1 hour of viscosity measurements, tan delta equal to 1 had not been achieved, indicating very good rheology stability.

TABLE 1

| | Films | | | |
|---|---|---|---|---|
| | Ex. 1 | Ex. 1A | Ex. 2 | Ex. 2A |
| Formulation | | | | |
| SBS (Kraton D1102) | — | — | 40.00% | 40.00% |
| SI/BS (Kraton D1171) | 99.00% | 99.00% | 59.00% | 59.00% |
| Irganox 1010 | 0.5% | 0.5% | 0.5% | 0.5% |
| Irgafos 168 | 0.5% | 0.5% | 0.5% | 0.5% |
| Properties | | | | |
| % Butadiene | ~24% | ~24% | ~53% | ~53% |
| E-Beam | none | 150 Kv/ 15 Mrad | none | 150 Kv/ 15 Mrad |
| MD Stress @ break (psi) | 800 | 1300 | 1200 | 1620 |
| MD Elongation @ break (%) | 1600 | 1100 | 1800 | 900 |
| CD Stress @ break (psi) | 880 | 1600 | 1980 | 2700 |
| CD Elongation @ break (%) | 1900 | 1200 | 1300 | 840 |
| CD Hysteresis (%) | 20 | 10 | 30 | 10 |
| CD 12 hr Stress Relaxation @ 100 F. - load loss (%) | 60 | 41 | 64 | 38 |
| CD 12 hr Stress Relaxation @ 100 F. - slope | −0.19 | −0.1 | −0.18 | −0.09 |

TABLE 2

| | Laminates w/films from Table 1 | | | |
|---|---|---|---|---|
| | Ex. 1 | Ex. 1A | Ex. 2 | Ex. 2A |
| Formulation | | | | |
| SBS (Kraton D1102) | — | — | 40.00% | 40.00% |
| SI/BS (Kraton D1171) | 99.00% | 99.00% | 59.00% | 59.00% |
| Irganox 1010 | 0.5% | 0.5% | 0.5% | 0.5% |
| Irgafos 168 | 0.5% | 0.5% | 0.5% | 0.5% |
| Properties | | | | |
| % Butadiene | ~24% | ~24% | ~53% | ~53% |
| E-Beam | none | 150 Kv/ 15 Mrad | none | 150 Kv/ 15 Mrad |
| CD Stress @ break (psi) | 1200 | 1600 | 2560 | 4800 |
| CD Elongation @ break (%) | 600 | 1100 | 980 | 600 |
| CD Hysteresis (%) | n.m. | n.m. | 45 | 30 |
| CD 12 hr Stress Relaxation @ 100 F. - load loss (%) | 62 | 42 | 64 | 38 |
| CD 12 hr Stress Relaxation @ 100 F. - slope | −0.15 | −0.1 | −0.18 | −0.06 | n.m. = not measured

TABLE 3

| Viscosity Stability | | |
|---|---|---|
| Wt. % S-I/B-S (Kraton D1171) | Wt. % SBS (Kraton D1102) | Time at which tan delta = 1, in min. |
| 100 | 0 | — |
| 75 | 25 | — |

TABLE 3-continued

Viscosity Stability

| Wt. % S-I/B-S (Kraton D1171) | Wt. % SBS (Kraton D1102) | Time at which tan delta = 1, in min. |
|---|---|---|
| 50 | 50 | — |
| 25 | 75 | 44 |
| 0 | 100 | 18 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An absorbent article comprising an absorbent core positioned between a substantially liquid-impermeable layer and a liquid-permeable layer, the article defining a front waist section, a rear waist section and an intermediate section interconnecting the front waist section and the rear waist section so that the article can be worn about the torso of a wearer, the article further including a waistband in at least one of the front waist section and the rear waist section and side panels joining the front waist section and the rear waist section, wherein at least a portion of at least one of the waistband or the side panels comprises an elastic film composite, the elastic film composite comprising an elastic film including an elastic composition comprising from about 10 wt. % to about 90 wt. % of styrene-butadiene-styrene block copolymer based upon the total weight of the elastic composition and from about 10 wt. % to about 90 wt. % of styrene-isoprene/butadiene-styrene block copolymer based upon the total weight of the elastic composition, wherein the styrene-butadiene-styrene block copolymer and the styrene-isoprene/butadiene-styrene block copolymer are cross-linked and a fibrous nonwoven facing layer is laminated to the elastic film.

2. The absorbent article of claim 1, wherein the elastic composition comprises from about 25 wt. % to about 75 wt. % of styrene-butadiene-styrene block copolymer based upon the total weight of the elastic composition and from about 25 wt. % to about 75 wt. % of styrene-isoprene/butadiene-styrene block copolymer based upon the total weight of the elastic composition.

3. The absorbent article of claim 1, wherein the elastic composition comprises from about 25 wt. % to about 50 wt. % of styrene-butadiene-styrene block copolymer based upon the total weight of the elastic composition and from about 50 wt. % to about 75 wt. % of styrene-isoprene/butadiene-styrene block copolymer based upon the total weight of the elastic composition.

4. The absorbent article of claim 1, wherein the side panels joining the front waist section and the rear waist section further include fastening means for releasably fastening the front waist section and the rear waist section.

5. The absorbent article of claim 4, wherein the absorbent article is a diaper.

6. The absorbent article of claim 1, wherein the absorbent article is a training pant.

7. The absorbent article of claim 1, wherein the absorbent article is an absorbent underpant.

8. The absorbent article of claim 1, wherein the absorbent article is an adult incontinence product.

* * * * *